(12) United States Patent
D'Aquisto et al.

(10) Patent No.: US 7,725,389 B1
(45) Date of Patent: May 25, 2010

(54) CLEARING HOUSE SETTLEMENT SYSTEM

(75) Inventors: Thomas D'Aquisto, Carrollton, TX (US); Fred J. Redeker, Alexandria, VA (US)

(73) Assignee: Viewpointe Clearing, Settlement & Association Services, LLC, Charlotte, NC (US)

( * ) Notice: Subject to any disclaimer, the term of this patent is extended or adjusted under 35 U.S.C. 154(b) by 1247 days.

(21) Appl. No.: 10/650,777

(22) Filed: Aug. 29, 2003

Related U.S. Application Data

(60) Provisional application No. 60/406,641, filed on Aug. 29, 2002.

(51) Int. Cl.
*G06Q 40/00* (2006.01)
(52) U.S. Cl. .......................................... 705/39; 705/42
(58) Field of Classification Search .................... 705/45, 705/35, 39, 42, 43; 709/204; 707/1, 100
See application file for complete search history.

(56) References Cited

U.S. PATENT DOCUMENTS

| | | | | |
|---|---|---|---|---|
| 5,265,007 | A | * | 11/1993 | Barnhard et al. ............... 705/45 |
| 5,484,988 | A | | 1/1996 | Hills et al. |
| 5,583,759 | A | * | 12/1996 | Geer ........................... 705/45 |
| 5,717,868 | A | * | 2/1998 | James .......................... 705/35 |
| 5,774,663 | A | * | 6/1998 | Randle et al. ............... 709/204 |
| 5,787,403 | A | * | 7/1998 | Randle ......................... 705/43 |
| 5,848,400 | A | * | 12/1998 | Chang ......................... 705/35 |
| 5,899,982 | A | * | 5/1999 | Randle ......................... 705/35 |
| 5,930,778 | A | * | 7/1999 | Geer ........................... 705/45 |
| 5,974,146 | A | * | 10/1999 | Randle et al. ............... 705/77 |
| 6,032,137 | A | | 2/2000 | Ballard |
| 6,098,053 | A | * | 8/2000 | Slater .......................... 705/44 |
| 6,164,528 | A | | 12/2000 | Hills et al. |
| 6,233,340 | B1 | | 5/2001 | Sandru |
| 6,283,366 | B1 | | 9/2001 | Hills et al. |
| 6,354,491 | B2 | | 3/2002 | Nichols et al. |
| 6,547,129 | B2 | | 4/2003 | Nichols et al. |
| 6,549,624 | B1 | | 4/2003 | Sandru |
| 6,792,110 | B2 | | 9/2004 | Sandru |
| 6,873,979 | B2 | * | 3/2005 | Fishman et al. ............... 706/21 |
| 7,251,624 | B1 | * | 7/2007 | Lee et al. ...................... 705/35 |
| RE40,220 | E | | 4/2008 | Nichols et al. |
| 2002/0026396 | A1 | * | 2/2002 | Dent et al. .................... 705/35 |
| 2002/0065752 | A1 | * | 5/2002 | Lewis .......................... 705/35 |

(Continued)

OTHER PUBLICATIONS

Plethora of Anti-Check Fraud Products Hit Market Item Processing Report, v 5, n 16, p. N/A August 18, 1994 ISSN: 1048-5120.*

(Continued)

*Primary Examiner*—Hani Kazimi
*Assistant Examiner*—William E Rankins
(74) *Attorney, Agent, or Firm*—Gardere Wynne Sewell LLP; Karl L. Larson

(57) ABSTRACT

A clearing house settlement system including a central host that manages information received from a number of institutions participating in a clearing house exchange. The host system receives presentment information from the institution participating in the clearing house exchange, processes the information, provides settlement calculations, provides various reports and information to the participating institutions regarding the exchange and provides communication between the participating institutions regarding the exchange. The host system being a web based system for communicating information over the Internet thus enabling participating institutions to access the central host to provide and retrieve information regarding the exchange on demand.

11 Claims, 1 Drawing Sheet

U.S. PATENT DOCUMENTS

2002/0128964 A1* 9/2002 Baker et al. .................. 705/39
2004/0230510 A1* 11/2004 Tyson-Quah ................ 705/35

OTHER PUBLICATIONS

Updating Timing Profiles for Millions of Customers in Real-Time Diane Lambert, Jos'e C. Pinheiro, and Don X. Sun Statistics and Data Mining Research Department Bell Labs, Lucent Technologies 600 Mountain Ave, Murray Hill, NJ 07974.*

Plethora of Anti-Check Fraud Products Hit Market Item Processing Report, v 5, n 16, p. N/A Aug. 18, 1994 ISSN: 1048-5120 Language: English Record Type: Fulltext Document Type: Newsletter ; Trade.*

* cited by examiner

CLEARING HOUSE SETTLEMENT SYSTEM

The present invention claims priority to U.S. Provisional Application No. 60/406,641 filed Aug. 29, 2002, the contents of which are incorporated herein by reference in their entirety.

BACKGROUND OF THE INVENTION

This invention relates to improvements in clearinghouse systems for receiving and processing presentment and settlement information. This system provides for the efficient and timely dissemination of presentment and settlement information to institutions participating in regional or national clearing houses.

SUMMARY OF THE INVENTION

In a clearing house settlement system checks and other cash items drawn against different institutions are exchanged. The clearing house participants to the exchange report data regarding the items presented and exchanged with other receiving institutions. These data, including the number of items and amount of items exchanged, are processed by the clearing house to calculate the net credit or debit for each institution participating in the exchange. The clearing house then initiates the debit or credit of an account of each member. As this process is automated and new communications methods are employed, such settlement systems are able to process more complex transactions and provide additional features and efficiencies.

The settlement system according the present invention enables the clearing house to exchange high volumes of items between a large number of institutions through multiple exchanges while maintaining a high level of control and reliability over the settlement process. The system controls which institutions may present items to which other institutions. The system provides for institutions to confirm the items presented to them prior to final settlement. The system provides for deferred item carryover and also for the automatic management of complex split presentation calculations.

The clearing house settlement of a preferred embodiment of the present invention includes a central host that manages information received from a number of institutions participating in a clearing house exchange. The host system receives presentment information from the institutions participating in the clearing house exchange, processes the information, provides settlement calculations, provides various reports and information to the participating institutions regarding the exchange and provides communication between the participating institutions regarding the exchange. Participating institutions access the central host to provide and retrieve information regarding the exchange.

The central host includes a central computer server to manage data calculation and storage and to manage communication of data to participating institutions. Participating institutions access the central server through local computers with a communications link, such as through the telephone system, to the central server. The participating institutions may access the system from multiple locations to transmit information regarding a single exchange.

The central server maintains a database of member institutions that participate in the exchange. This database stores the information regarding the participating institutions that is pertinent to the exchange and settlement.

The central host receives information from the participating institutions regarding the items that are exchanged. This information may be received from different locations for one participating institution. The settlement totals calculated by the central server will reflect all the data received regarding each participating institution. The central host processes the credits and debits owing from one participating institution to another to provide net settlement totals and initiates the credits and debits to effect settlement between the participating institutions. The central host also provides reports regarding the settlement to the participating institutions.

The central host provides certain calculations to help to verify the accuracy of the information provided by the participating institutions. For instance, the central host calculates the average balance presented by individual participating institutions in past exchanges. The central host is then able to check that current presentment totals for the institution are within a set percentage of their average balance. This check allows any high impact deviations from normal presentment totals to be verified and thus reduces high impact errors from the settlement calculations.

In operation, a participating institution prepares information regarding the items for presentment through a particular exchange on a particular date. The presenting member provides the number of items and amount of the items for exchange with other institutions participating in the exchange. The information is entered for each receiving institutions by the presenting institution and may be divided into more than one amount for a single receiving participant. This presentment information is communicated to the central host prior to the settlement. The system permits the information to be edited prior to communication and provides procedures to edit the information after communication but prior to settlement.

The central host receives the information from the participating institutions. Typically the information will be transmitted from local computers at the participating institution directly to the central server. However, provision is made to input presentment information to the central server that is received by the central host by other means.

As noted above, the central host maintains calculations of the average presentment amount totals from previous settlements. Such averages are maintained on a rolling basis for a set time period, such as the prior eight weeks. The central host calculates the variance between the average presentment amount and the current presentment amount. Based on a maximum percentage variance allowed that is maintained for each institution, the central host calculates a maximum presentment allowed for each institution. If the current presentment total is greater than the maximum presentment allowed, then the presentment total is verified through communication with the presenting institution.

The central host performs presettlement calculations. The presettlement calculations include a final verification of the present variances and the receipt variances for participating institutions. After presettlement calculations, the central host performs the settlement calculations to determine the net credits and debits between the participating institutions.

After the settlement is performed various reports regarding the settlement are available to the participating institutions. These reports include reports that detail the incoming totals and outgoing totals, recap the net settlement, provide the average balances used for variance calculations, provide volumes, etc.

Although it is possible to provide flexible specific services and adjustment through manual data manipulation, an advantage of the present system is the ability to conduct additional computer controlled automatic functions, calculations and additional communication functions. The items exchanged are organized by cash letters that are exchanged through the clearing house. By providing presentment information that indicates the cash letter amount, item counts and cash letter type, the central server is able to calculate totals based on these input values such cash letter type. The cash letters presented for exchange are identified as one of many types. These types allow the system to process and track different types of cash letter for purposes such as billing. As another example, cash letter type may easily designate cash letter as a deferred cash letter. Deferred items are thus easily distinguished from other presented items. Thus at presentment the cash letter type and the number of days the cash letter is deferred is easily displayed with cash letter amounts and the item volume. The system readily tracks deferred value of cash letters input in the system for presentment and exchange. Deferred items from previous days are easily designated throughout the host processing and reporting.

The automatic nature of the system permits data regarding each member to be automatically used during the settlement process. For example, the information regarding the participating members in an exchange will include data regarding the holiday schedule for that institution. Thus, during the input of entry of exchange information a participating institution is able to be informed that of a holiday at another institution. Items to be exchange with institution that is on holiday can be automatically deferred to the first exchange day that they will both be in operation.

The system also allows for split items. The automatic system can auto-calculate split items based information maintain regarding a particular institution. The system calculates and tracks actual payout percentages and payout dates. Split amounts not considered current day are excluded from the settlement totals for the day. The volume count is settled on the current day.

Presenting members may also designate an item to a hold status. Items with a hold status are automatically carried over to the same exchange on the next valid business day. The carry over will continue until the hold is removed or the item is deleted from the system.

The system enables the confirmation of the presented items prior to settlement. To enable confirmation the central host performs confirmation settlement operation. This operation prepares the presentment information for the receiving institutions. After the confirmation settlement operation the receiving institutions obtain confirmation information. Using this information the institution review and confirm the individual items presented to them. For items that are not confirmed, the system automatically requires a reason. The reason may be selected from a list provided by the system. The reason may also be supplemented by an explanation input in certain situations.

The system serves to connect each institution with the central host and thus indirectly with each other institution. This connectivity is easily used as a communications conduit between institutions. A local computer at an institution connects to the central server to transmit present information or to retrieve confirmation information and reporting information. This connection may also be used to transmit and receive communications, typically in the form of e-mail, from the central host. Messages may also be sent to other institutions through the central server and retrieved from other institutions through the central server. This messaging system includes functions to enhance the settlement process. Such functions include capabilities to address messages to particular departments or offices at an institution. The message system is automatically used to communicate information in certain circumstances. For example, the confirmation, or non-confirmation, of items may cause the system to automatically generate a message to inform the presenter of the confirmation action. The message may be automatically generated using standard message text or if further explanation is required the confirmation process may require user input to the email.

DETAILED DESCRIPTION OF PREFERRED EMBODIMENTS

Figure 1:
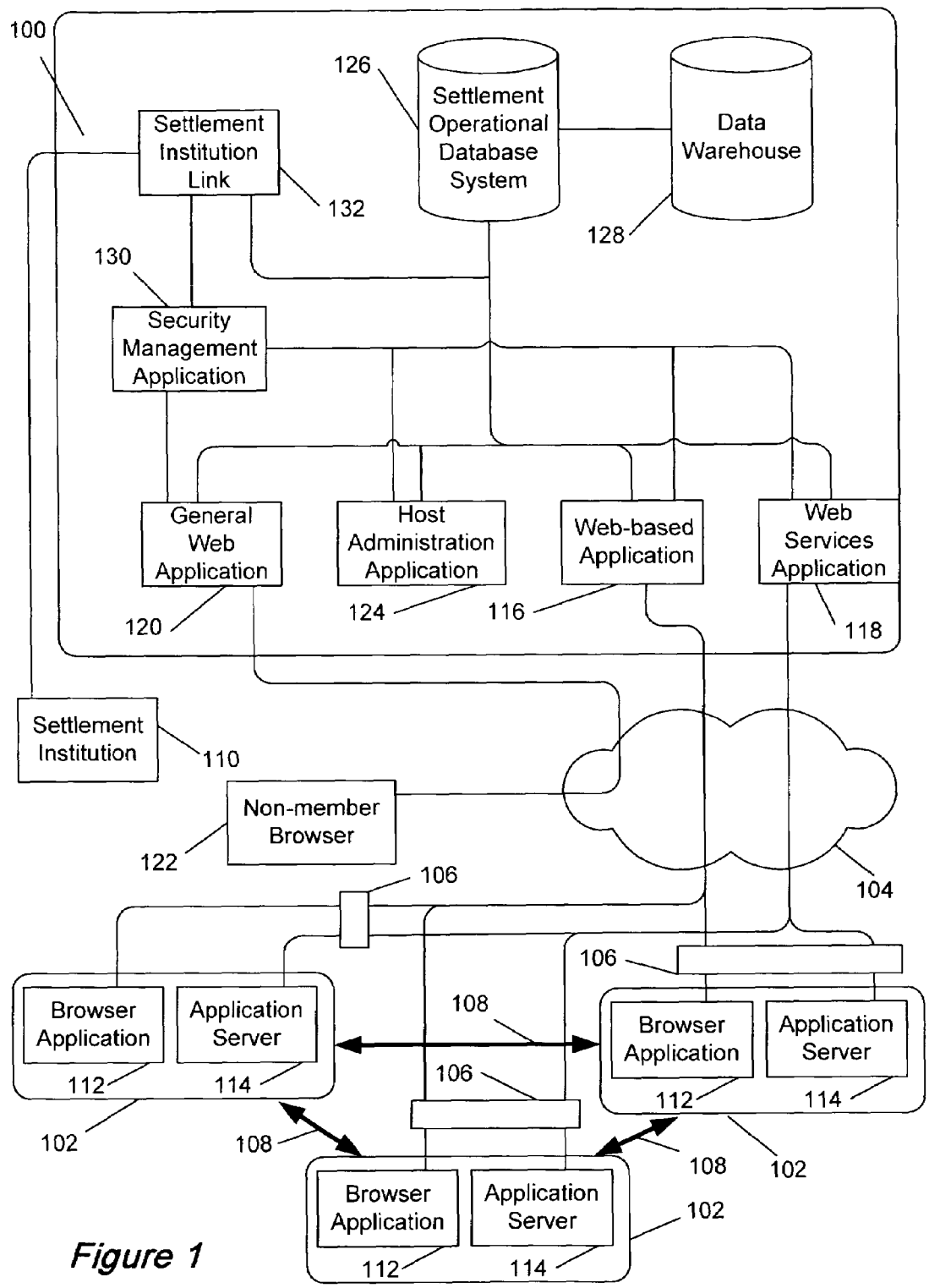
FIG. 1 illustrates the settlement system of the present invention.

In a clearing house system, various member financial institutions exchange checks that are to paid through other members institutions. In more simple clearing houses, member banks exchange checks drawn on other member banks. In more extensive regional and national clearinghouses, members may also exchange checks drawn on other members of their local clearing houses. In this clearing house system, a central host is maintained to facilitate the exchange of information with the participating institutions and conduct settlement processes for each exchange. This system is illustrated in FIG. 1.

The clearing house system shown in FIG. 1 includes a central host 100 in communication with various member institutions 102. The central host 100 provides settlement services in a web-based environment. The member institutions 102 access the central host through the Internet 104. Member institutions 102 may exchange checks directly through procedures established in check exchange programs 108. Through a secure Internet connection 106, each member institution 102 accesses the central host 100 to provide presentment totals they have exchanged. The central host 100 computes each member institution's daily net position, provides this information to the member institutions 102 over the Internet 104, and provides net settlement figures to a settlement institution 110, which debits and credits member institutions accounts accordingly.

FIG. 1 further shows components of the clearing house system at each member institution 102 for communicating with the central host 100. Each member institution 102 uses a browser application 112 as a user interface to communicate with the central host 100. The browser application provides users with a graphical interface that is familiar to computer users and is flexibly implemented on computer workstations using various platforms at member institutions 102. Through the browser application 112, users at each member institution receive settlement information and may input presentment data. Member institutions 102 may also employ an application server 114 for automating the input of presentment data to the central host 100.

Components of central host 100 for receiving and processing presentment data from member institutions 102 are also shown in FIG. 1. A web-based application 116 securely sends and receives information when accessed by browser applications 112. The web-based application controls an Internet server for communicating with browser applications 112 over the Internet 104. A web services application 118 communicates with application servers 114 to receive automated presentment data. The central host also includes a general web application 120 that provides information through the Internet 104 to non-members browsers 122. A host administration application 124 enables the clearing house operators to control and interface with the central host 100. A settlement operational database system 126 maintains the data provided through web-based application 116 and web services application 118 and internally calculated data used during the daily settlement processes. A data warehouse 128 receives data from operational database 126 on settled transactions for historical analysis and reporting. A security management application 130 provides centralized user and security management. A settlement institution link 132 provides the net settlement figures to settlement institution 110.

The central host 100 of the clearing house system provides multilateral settlement calculations for member institutions 102 participating in various exchanges conducted at various time throughout the week and throughout the day, provides information to the member institutions 102 regarding the exchanges in which they participate, and provides for communication between member institutions 102. In a typical national exchange, member institutions 102, such as large banks, exchange checks through check exchange programs 108, such as by air courier, that they have received directly or through participation in local clearing houses. Each participating member institution 102 provides presentment data to the central host 100 manually through browser application 112 or automatically through interface between application server 114 and the member institution's internal data management systems. Each participating member institution 102 also accesses the presentment information regarding itself that other participating member institutions have provided to central host 100 and inputs information to confirm that the presented checks have been received. The data is maintained in settlement operational database system 126. The web-based structure of the clearing house system allows member institutions to access this information as required through browser application 114. Forms of information assembled by host administration application 124 are requested by browser application 112 and provided through web-based application 116 based on the real-time data maintained in settlement operational database system 126. At the scheduled settlement time, final settlement figures are established, transmitted to a settlement institution 110 such as the Federal Reserve through the Enhanced Net Settlement Service, and are communicated to the participating member institutions through web-based application 116. As the central host receives the exchange data in a continuous and flexible manner separate settlement calculations can be computed for individual participants. After a period of time has passed the data regarding the exchange is transferred to the data warehouse 128. The web-based clearing house system provides for rapid exchange of real-time data between the central host 100 and member institutions 102 in a form that is familiar to users of browser applications.

This system also provides for communication of time sensitive information regarding an active exchange to participating member institutions 102. Upon login to the central host 100, each member institution 102 accesses a home page of information though browser application 112. A broadcast messaging system uses such home pages to communicate messages to all participating member institutions 102. The clearing house operator through host administration application 124 can create each message with a target, subject, message, start date and end date. The target indicates to which participants to communicate the message. The target could be general, such that all member institutions 102 will receive the message, or could be limited to a particular exchange, such that only member institutions 102 participating in the particular exchange will receive the message. The subject provides general information to organize messages. The message includes the information to be communicated. The start date and end date designate the time during which the message will appear on the page. Accordingly, timely information regarding the clearing house and each exchange is distributed in a timely manner through the clearing house system.

Perhaps more importantly, the system provides for communication of real-time information to exchange participants on demand. Each member institution 102 is able to retrieve information through browser application 112 and web-based application 116 regarding exchanges in which they are participating. Specific information is available regarding the transactions in which they are involved. Accordingly, each member institution is able to retrieve current information from the settlement operational database system 126 regarding the status of transactions that they have presented and those requiring their confirmation as well as their net position at any given time. Further, the positions of each participating member institution may be requested and calculated on demand. To retrieve information, a member institution issues a request through browser application 112. The request is processed by web-based application 116, which employs a report generator to retrieve relevant information from the settlement operational database system 126 and to construct the report. The report is then communicated to the requesting browser application 112 for viewing. The report may be formatted as requested by the requesting user. Accordingly, each member institution has access to full pre-settlement and settlement information as required. The clearing house operator obtains exchange information in a similar manner through host administration application 124.

The system further provides for communication of time sensitive information between exchange participants. Communication between member institutions is generally provided at the presentment transaction level. Accordingly, participants may access and input to a comment log related to each presentment and associated confirmation. These comments are inputted and accessed through forms processed by browser application 112 and web-based application 116. Accordingly, critical information regarding the exchange of checks or other items between institutions is timely communicated between member institutions.

The clearing house system may also communicate information to non-members through the Internet. Information, such as availability schedule indicating the participants in particular exchanges, is provided as web pages through general web application 120 to anyone over the Internet 104. The information provided may include information from the settlement system and thus may be dynamically generated.

The clearing house system central host 100 electronically communicates final settlement figures to the settlement institution 110 in a manner and format acceptable to the settlement institution 110. This communication may occur through the Internet or through other communications means. The settlement institution may also obtain information as through a browser application 112 in a manner similar to any member institution 102.

The security management application 130 ensures secure communication between the central host 100 and member institutions 102 by maintaining a directory of member information and authorizing access to information at the central host 100.

Further data communication occurs with the central host 100. The central host 100 may include duplicate components, which may be located at remote physical sites for reliability. Accordingly, data may be mirrored to redundant components at regular intervals. These duplicate components may be called on to perform the functions described herein should the primary components fail. The Internet readily permits communication to be routed to alternate servers in the case of primary server failure.

In a similar manner a member institution 102 may communicate with the central host through any properly authenticated browser application 112 or application server 114. Users at a particular member institution 102 access the central host through various browser applications 112. Each user is authenticated by security management application 130. Different users from a single member institution may be provided with different levels of access depending on the user's role. Particular users may be authorized to enter presentments while different users are authorized to enter confirmations. Different users at a single member institution 102 may be provided access to different reports or types of reports.

The web-based structure this clearing house system permits the host system 100 to closely monitor the exchange process. Tracking information from couriers employed in the check exchange program 108 may be sent, retained and disseminated through central host 100. The check exchange program 108 may also use an electronic check presentment system, which may provide information to the central host 100. The structure also enables the host system to be used to communicate electronic check presentment information thus reducing or eliminating the requirement for a separate check exchange program 108. The settlement operational database system 126 may thus maintain information on individual checks or transactions. This information may include image information of checks where appropriate.

In operation a user at a member institution 102 uses a browser application 112 to access the clearing house system web site. The user is authenticated by the security management system 130 and accesses the home page of the settlement system where broadcast messages and announcements are displayed. Depending on the authorization of the user, access to a number of functions is available. The user may select an exchange in which the institution is participating and input the presentment data to the central host 100. Presentment pages are accessed to view and edit the presentment figures regarding the items presented to the other members participating in the exchange. The initial presentment data may be input by the user through this page. Alternatively the initial presentment data may be input by application server 114 and then viewed and edited through this page. Through this page the user may view the cash letters presented that have been confirmed, not confirmed, or have not been acted on along with and holds that have been indicated. Similar information is viewed regarding adjustments and returns. Further information regarding the exchange and transactions may also be available to the user. The system indicates whether the institution's presentments are with risk tolerances. Other information such as electronic check presentment data or images may also be viewed through this page if available. A confirmation page is similarly accessed permitting the user to confirm which cash letters that have been presented to them have been received and accepted. For each transaction between institutions comments regarding the transactions may be entered and viewed through interaction with these pages. Users at each member institution are able to conduct all required functions regarding participation in the clearing house through this system. Users at each member institution are able to conduct all functions regarding a particular exchange at any time during at set period of time prior to the settlement of the exchange. Confirmations can be entered as completed. Reports can be retrieved on demand. Functions such as splitting presentment totals over multiple days and deferring presentments are available to the participants in each exchange. Users may access pages to edit the types of cash letter that the participant accepts and the attributes of these offerings such as the associated fees and the days of the week and the dates that the particular cash letters will be accepted. As the user inputs or edits information through browser application 112 it is communicated securely through web-based application 116 to update the settlement operational database system 126. This information is then available as appropriate to the clearing house operator through host administration application 124, other member institutions through browser applications 112, and other through non-member browsers 122.

The clearing house operators monitor and control the exchange process through the host administration application 124. Various functions controlled through the host administration application 124 include the ability to view pages including the status of the each exchange by viewing for each participant the number of transactions presented, the value of the transactions, the number of items presented, the value of transactions received, the number of items received, the number of transactions confirmed by the participant, the number non-confirmed by the participant, and the transaction in which action has not been taken. These pages indicate whether the participants' totals are within the risk tolerance set for the exchange. Further detailed information regarding each transaction may also be viewed. Such details may include the transaction date, the type of cash letter, the amount of the cash letter, the cash letter item count, whether the transaction is confirmed or non-confirmed, when the transaction is to be paid if a deferred or split transaction, and whether the transaction is in hold status. The operators may view risk control pages that include information for each participant regarding the average presentment amount for the day, the allowable percentage high and low variance, maximum and minimum presentment amount based on the allowable variance, and the current presentment amount. These pages provide similar data regarding participants' receipts. The operator may access pages to create broadcast message and general messages for each exchange. The operators may also access pages similar to those available to the member institution users. Through such pages the operators may perform data entry for member institution when required. The operators also access pages to control the administrative aspects of the clearing house. These pages allow holidays to scheduled. They allow the parameters for each exchange to be established and edited.

Other embodiments, uses and advantages of the present invention will be apparent to those skilled in the art from consideration of the specification and practice of the invention disclosed. The specification and examples are exemplary. The scope of the invention is set forth by the following claims.

What is claimed is:

1. A clearinghouse system for exchanging debits and credits between participating institutions, the system comprising:
   a plurality of remote computers of participating institutions;
   a central server;
   a network interface in communication with the central server and the plurality of remote computers over a network, the network interface being configured to receive a plurality of presentment data from one or more of the plurality of remote computers, each of the plurality of presentment data including one or more debit or credit items each having a presentment amount;
   a database in communication with the central server;

wherein the central server:
receives presentment data via the network interface from at least two of the plurality of remote computers of participating institutions;
stores in the database the plurality of presentment data previously received over a predetermined rolling time period;
calculates an average presentment amount of the stored presentment data for one or more of the participating institutions from which presentment data is received, wherein each average presentment amount represents an overall average presentment for each of respective participating institutions calculated;
determines the difference between the average presentment amount and the presentment amount of the currently received presentment data;
automatically initiates the debits and credits corresponding to the presentment data only when the difference is within a predetermined variance;
verifies the debits and credits corresponding to the presentment data when the difference is more than the predetermined variance; and
communicates at least a portion of the stored presentment data via the network interface to one or more of the plurality of remote computers on demand.

2. The system of claim 1, wherein the presentment data includes information designating the types of items presented for exchange and wherein the central server stores the types of items each participating institution accepts.

3. The system of claim 1, wherein the central server enables communication between the participating institutions regarding the exchange.

4. The system of claim 1, wherein the central server includes an Internet server.

5. The system of claim 4, wherein the Internet server communicates data between the central server and web browsers on the remote computers.

6. The computer program product system of claim 1, wherein the participating institutions exchange items by means of the network interface.

7. The system of claim 6, wherein the central server is further configured to store information relating to the items electronically exchanged.

8. The system of claim 1, wherein the presentment data communicated to one or more of the plurality of computers on demand includes net pre-settlement positions.

9. The system of claim 1, wherein the network interface is further configured to receive a plurality of confirmation data from one or more of the plurality of remote computers, wherein the confirmation data includes information regarding whether the items in the presentment data is accepted.

10. The system of claim 1, wherein initiating the debits and credits comprises providing information relating to at least a portion of the presentment data to a settlement institution which debits and credits the participating institutions accounts.

11. A method for exchanging debits and credits between participating institutions of a clearing house system that includes a plurality of remote computers of participating institutions, a central server, a network interface in communication with the central server and the plurality of remote computers over a network, the network interface being configured to receive a plurality of presentment data from one or more of the plurality of remote computers, each of the plurality of presentment data including one or more debit or credit items each having a presentment amount, and a database in communication with the central server, the method comprising:
receiving presentment data via the network interface from at least two of the plurality of remote computers of participating institutions;
storing in the database the plurality of presentment data previously received over a predetermined rolling time period;
calculating an average presentment amount of the stored presentment data for one or more of the participating institutions from which presentment data is received, wherein each average presentment amount represents an overall average presentment for each of respective participating institutions calculated;
determining the difference between the average presentment amount and the presentment amount of the currently received presentment data;
automatically initiating the debits and credits corresponding to the presentment data only when the difference is within a predetermined variance;
verifying the debits and credits corresponding to the presentment data when the difference is more than the predetermined variance; and
communicating at least a portion of the stored presentment data via the network interface to one or more of the plurality of remote computers on demand.

* * * * *